US011537577B2

(12) United States Patent
Richards et al.

(10) Patent No.: US 11,537,577 B2
(45) Date of Patent: Dec. 27, 2022

(54) METHOD AND SYSTEM FOR DOCUMENT LINEAGE TRACKING

(71) Applicants: Philip L. Richards, Pleasant Grove, UT (US); Daniel K. Blair, Northfield, IL (US); John T. Ritter, Charlotte, NC (US); Gregory R. Sheaffer, Charlotte, NC (US)

(72) Inventors: Philip L. Richards, Pleasant Grove, UT (US); Daniel K. Blair, Northfield, IL (US); John T. Ritter, Charlotte, NC (US); Gregory R. Sheaffer, Charlotte, NC (US)

(73) Assignee: Breakwater Solutions, LLC, Austin, TX (US)

( * ) Notice: Subject to any disclaimer, the term of this patent is extended or adjusted under 35 U.S.C. 154(b) by 174 days.

(21) Appl. No.: 16/858,180

(22) Filed: Apr. 24, 2020

(65) Prior Publication Data

US 2020/0341957 A1 Oct. 29, 2020

Related U.S. Application Data

(60) Provisional application No. 62/838,503, filed on Apr. 25, 2019.

(51) Int. Cl.
| | | |
|---|---|---|
| *G06F 16/21* | (2019.01) | |
| *G06F 16/13* | (2019.01) | |
| *G06F 16/27* | (2019.01) | |
| *G06F 16/93* | (2019.01) | |
| *G06F 16/11* | (2019.01) | |

(52) U.S. Cl.
CPC .......... *G06F 16/219* (2019.01); *G06F 16/116* (2019.01); *G06F 16/137* (2019.01); *G06F 16/27* (2019.01); *G06F 16/93* (2019.01)

(58) Field of Classification Search
CPC .... G06F 16/116; G06F 16/137; G06F 16/219; G06F 16/27; G06F 16/93; H04L 9/0643
See application file for complete search history.

(56) References Cited

U.S. PATENT DOCUMENTS

| | | | | |
|---|---|---|---|---|
| 10,467,252 B1 * | 11/2019 | Barsony | ................ | G06F 16/285 |
| 2007/0030528 A1 * | 2/2007 | Quaeler | .................. | G06F 16/33 358/448 |
| 2008/0040388 A1 * | 2/2008 | Petri | ...................... | G06F 16/907 |

(Continued)

*Primary Examiner* — Merilyn P Nguyen

(57) ABSTRACT

A method and system for tracking the history of possession, activity, and changes related to an electronic document after its creation includes a document in a file system on an computing device having linked metadata which tracks hash values that update when a user performs a document action. Each hash value indicates a fixed document state. The metadata stores hash value identifiers associated with the initial document state and the document state right before the most recent document action and a list of identifiers associated with every state of the document in its history. The method and system allows for branching of multiple documents from a common state, identified by a common hash value and includes components to visualize a document's lineage. The method and system also includes the ability to store information in a document regarding similar, or near duplicate, documents that do not share the same lineage.

19 Claims, 17 Drawing Sheets

(56) References Cited

U.S. PATENT DOCUMENTS

| | | | |
|---|---|---|---|
| 2009/0087098 A1* | 4/2009 | Ohira | G06F 16/532 |
| | | | 382/209 |
| 2010/0169653 A1* | 7/2010 | Takenaka | H04L 9/3247 |
| | | | 713/176 |
| 2016/0378737 A1* | 12/2016 | Keslin | H04L 12/1822 |
| | | | 715/753 |
| 2017/0054736 A1* | 2/2017 | Krishnamurthy | G06F 21/6209 |
| 2017/0126702 A1* | 5/2017 | Krishnamurthy | G06F 21/604 |
| 2020/0162236 A1* | 5/2020 | Miller | G06F 40/174 |
| 2020/0162266 A1* | 5/2020 | Miller | H04L 9/3247 |
| 2020/0279004 A1* | 9/2020 | Serdy | G06F 16/906 |

* cited by examiner

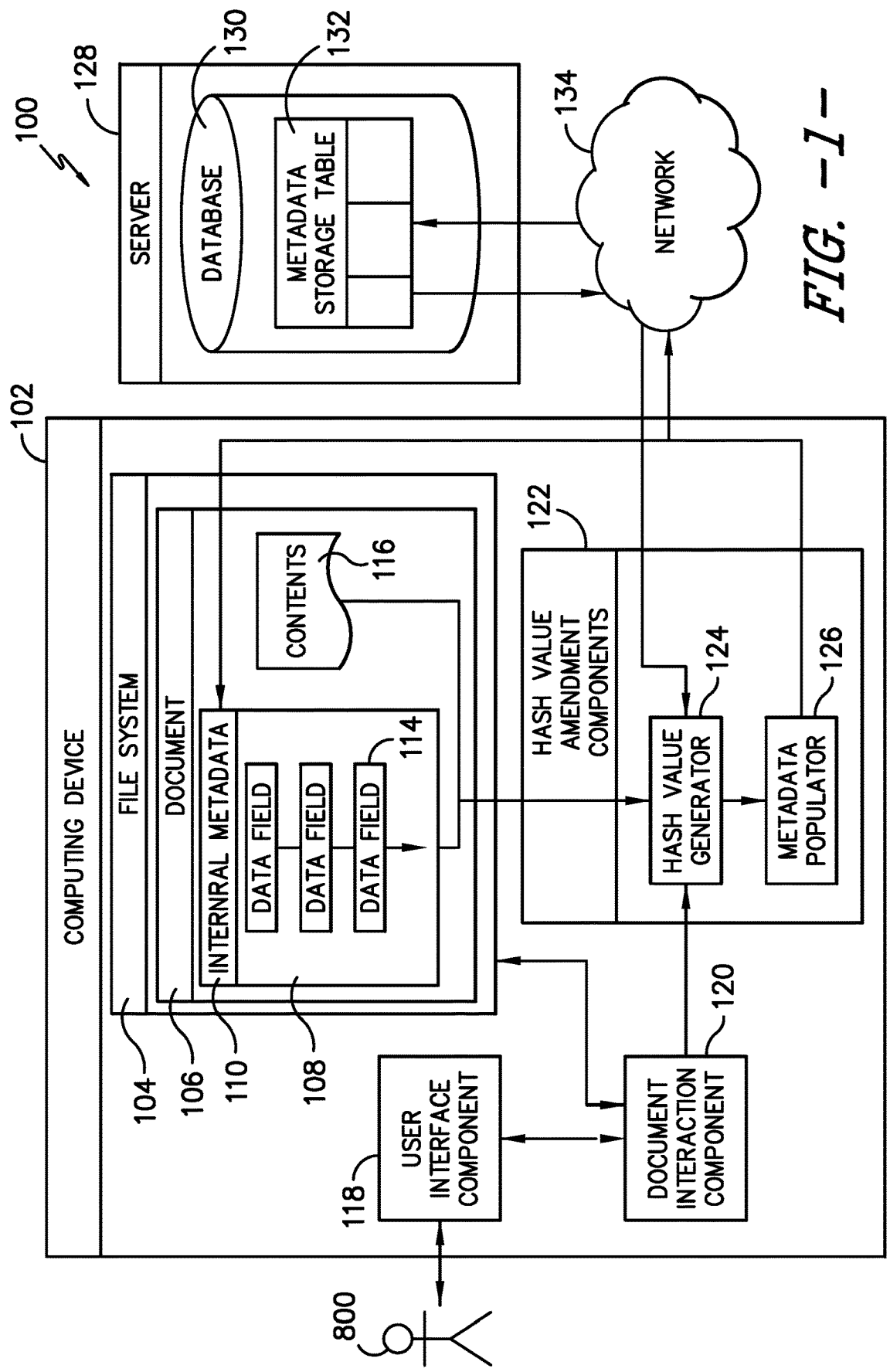

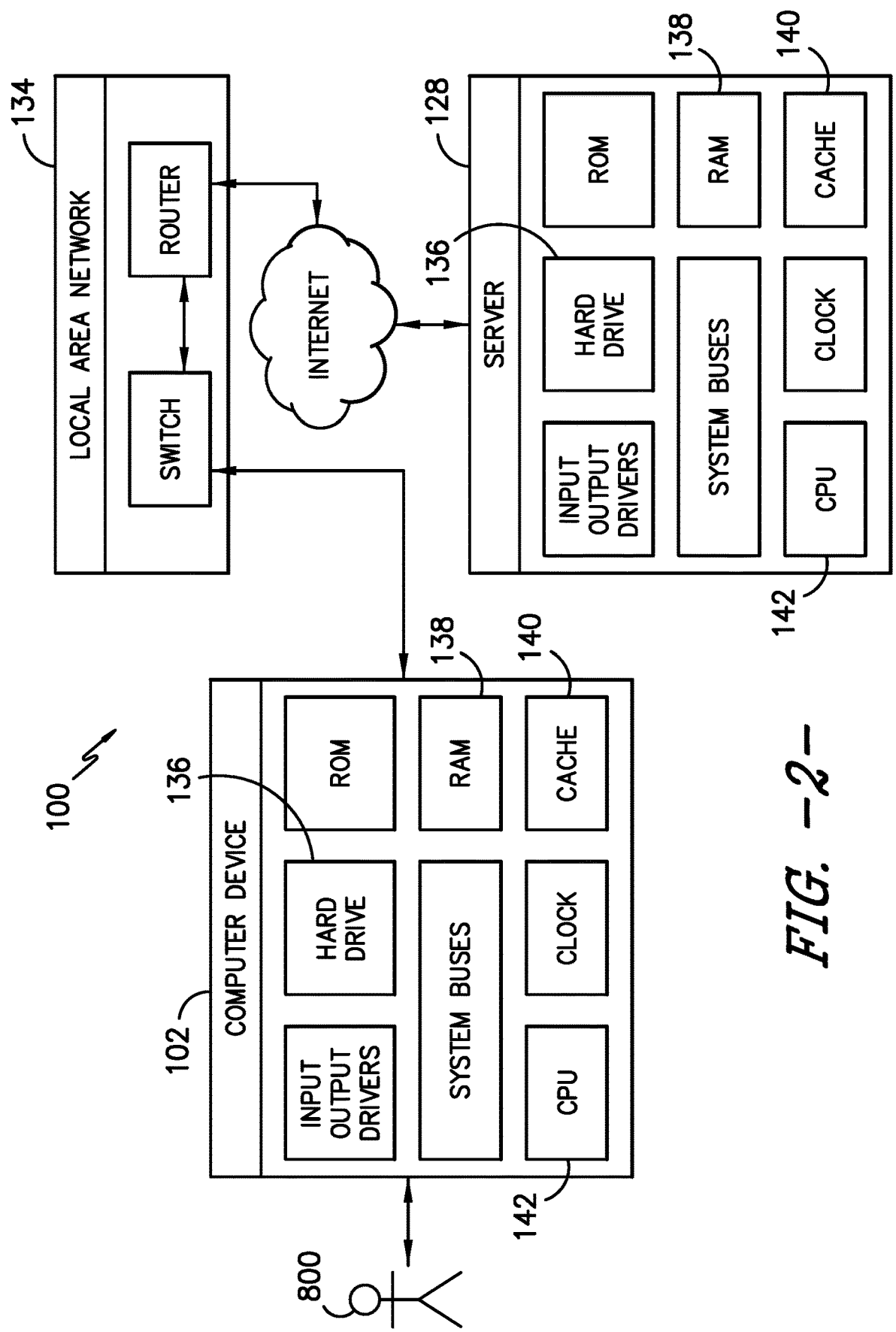
FIG. -2-

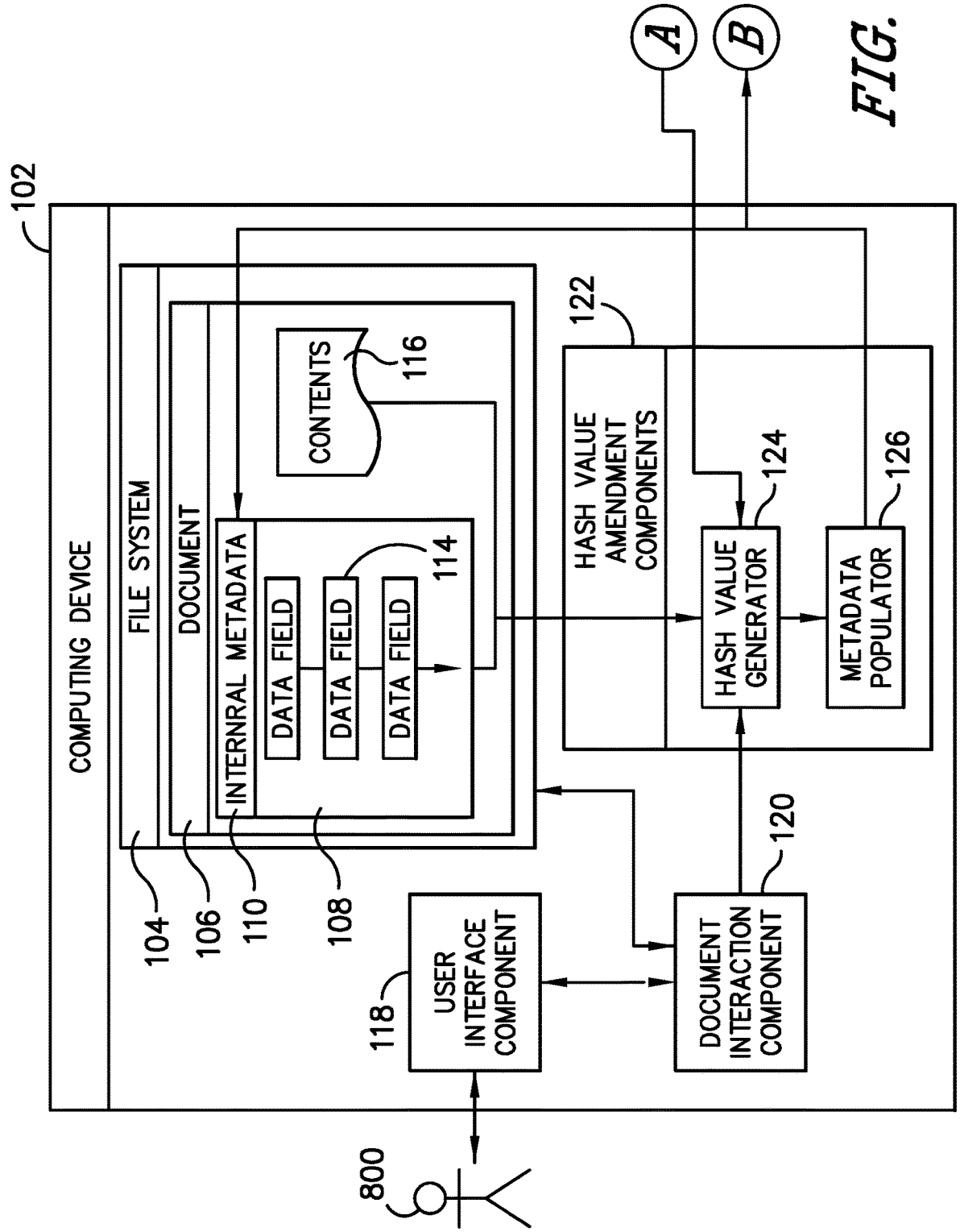
FIG. -3A-

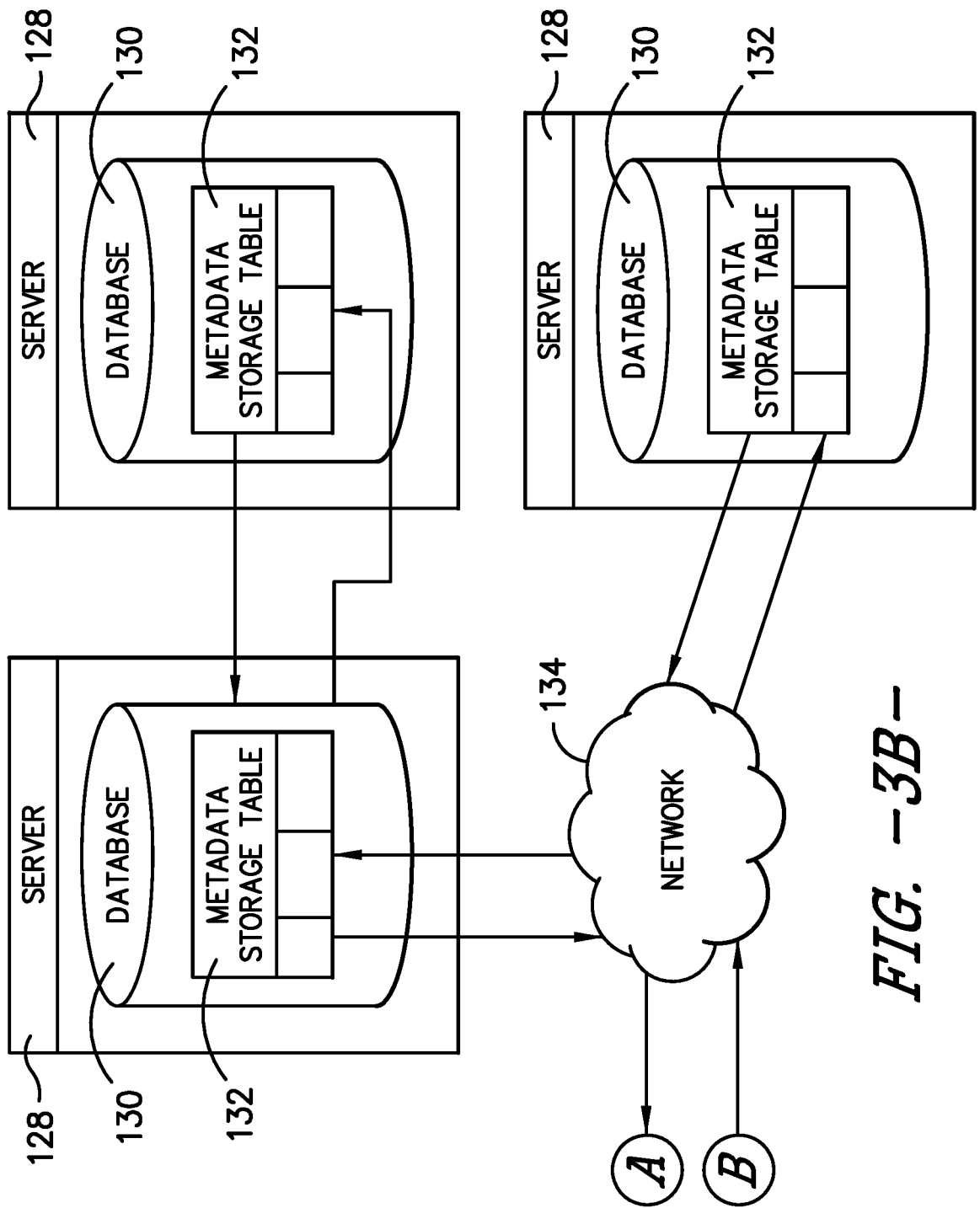
FIG. -3B-

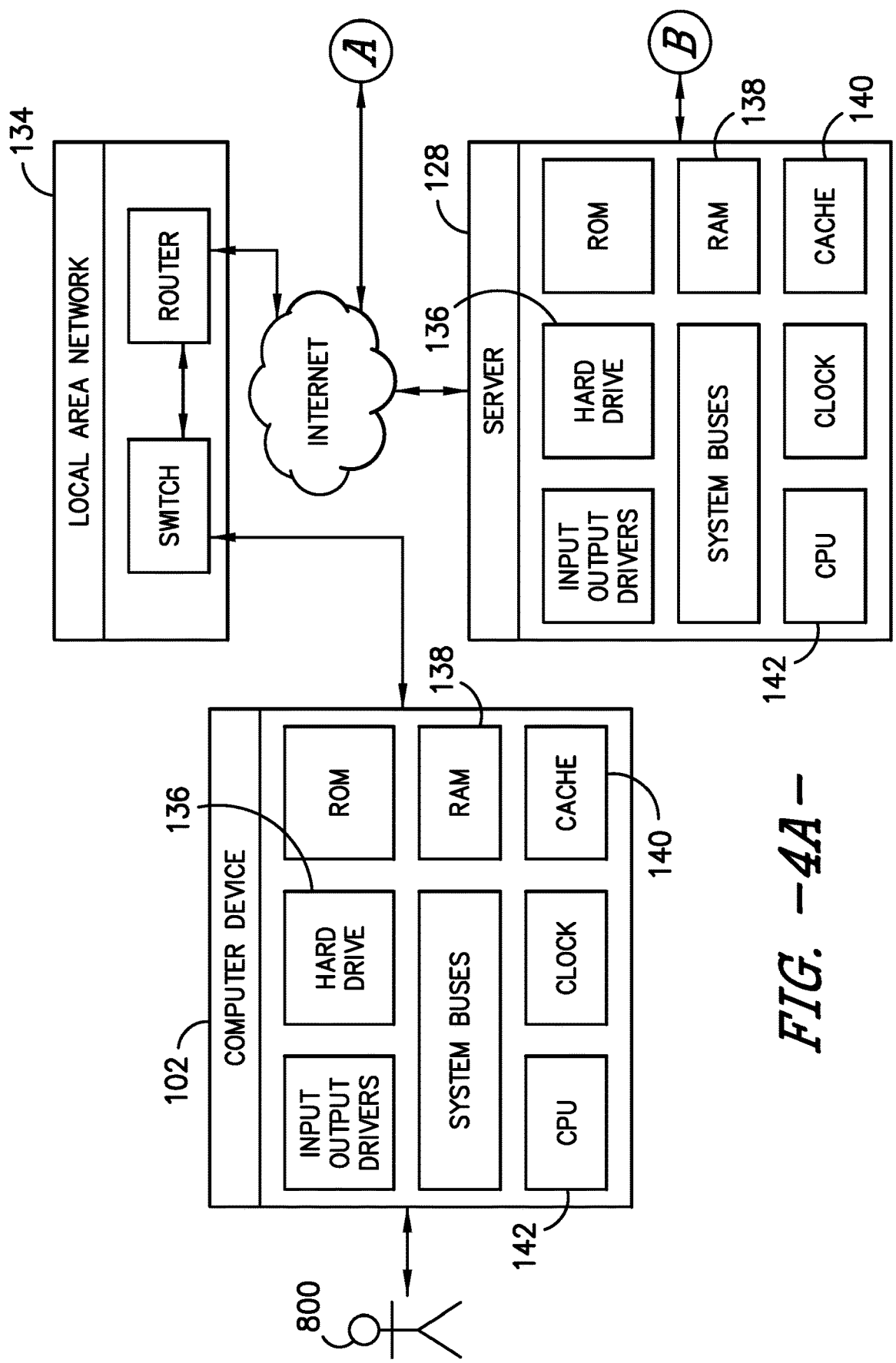
FIG. -4A-

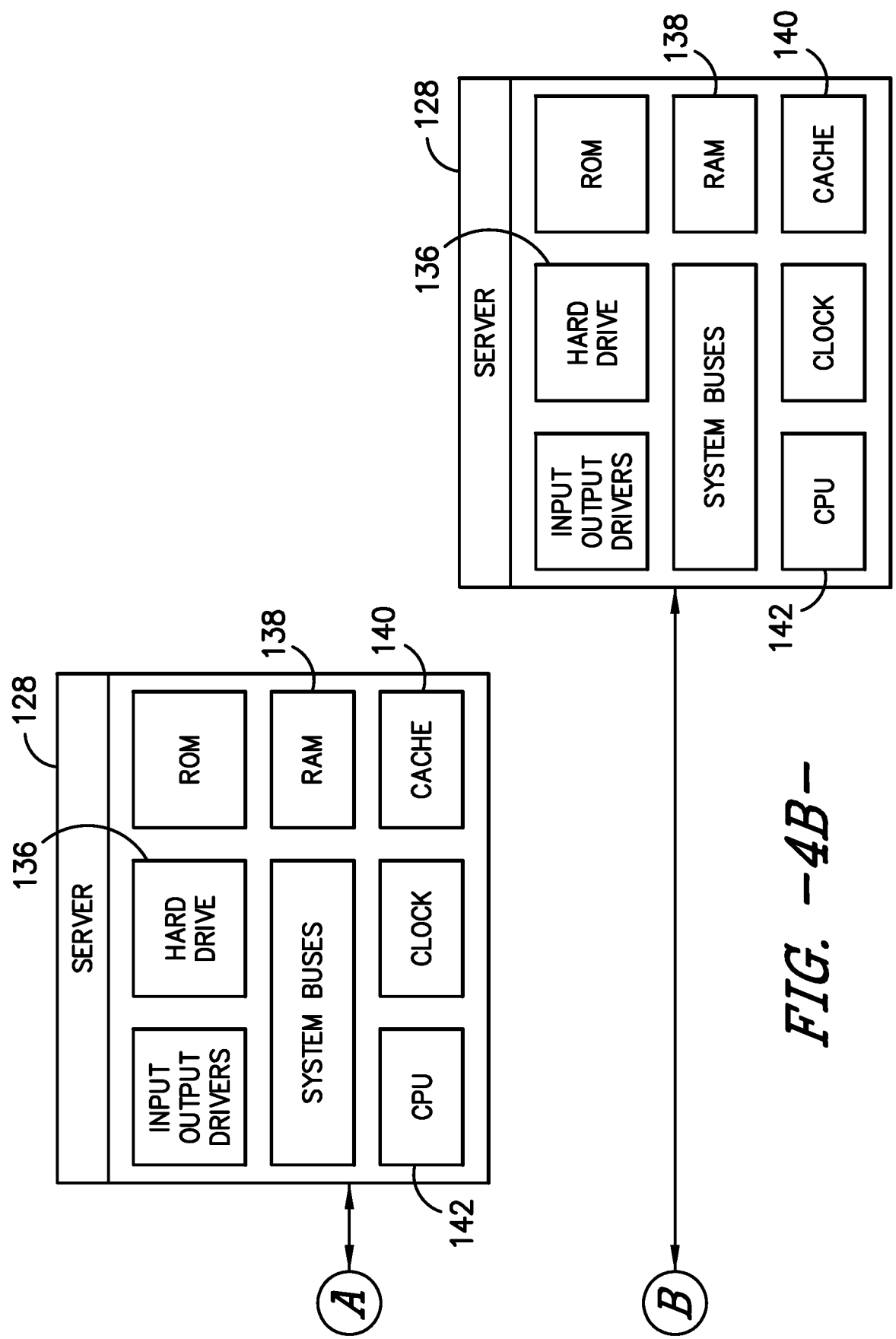
FIG. -4B-

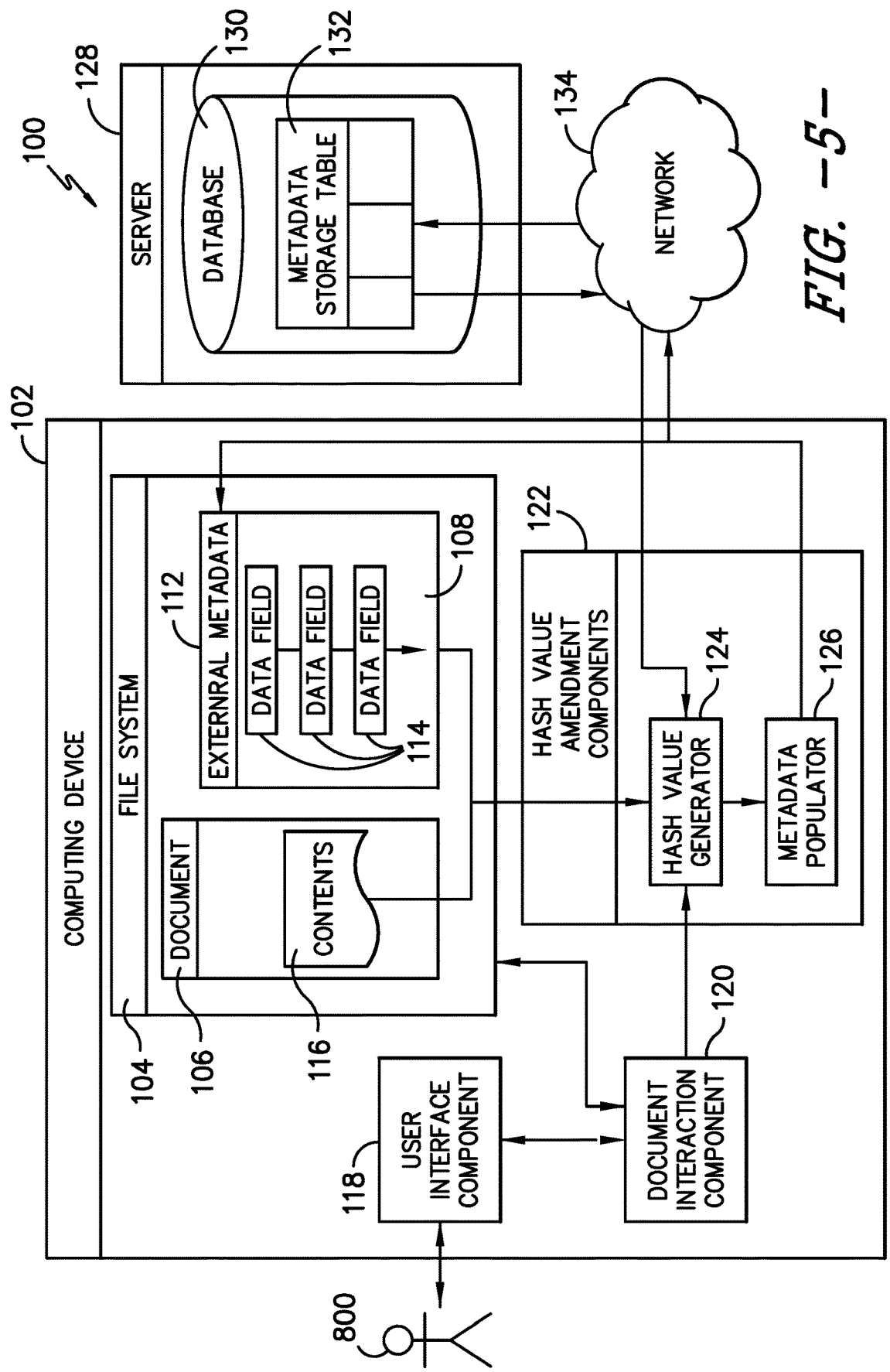
FIG. -5-

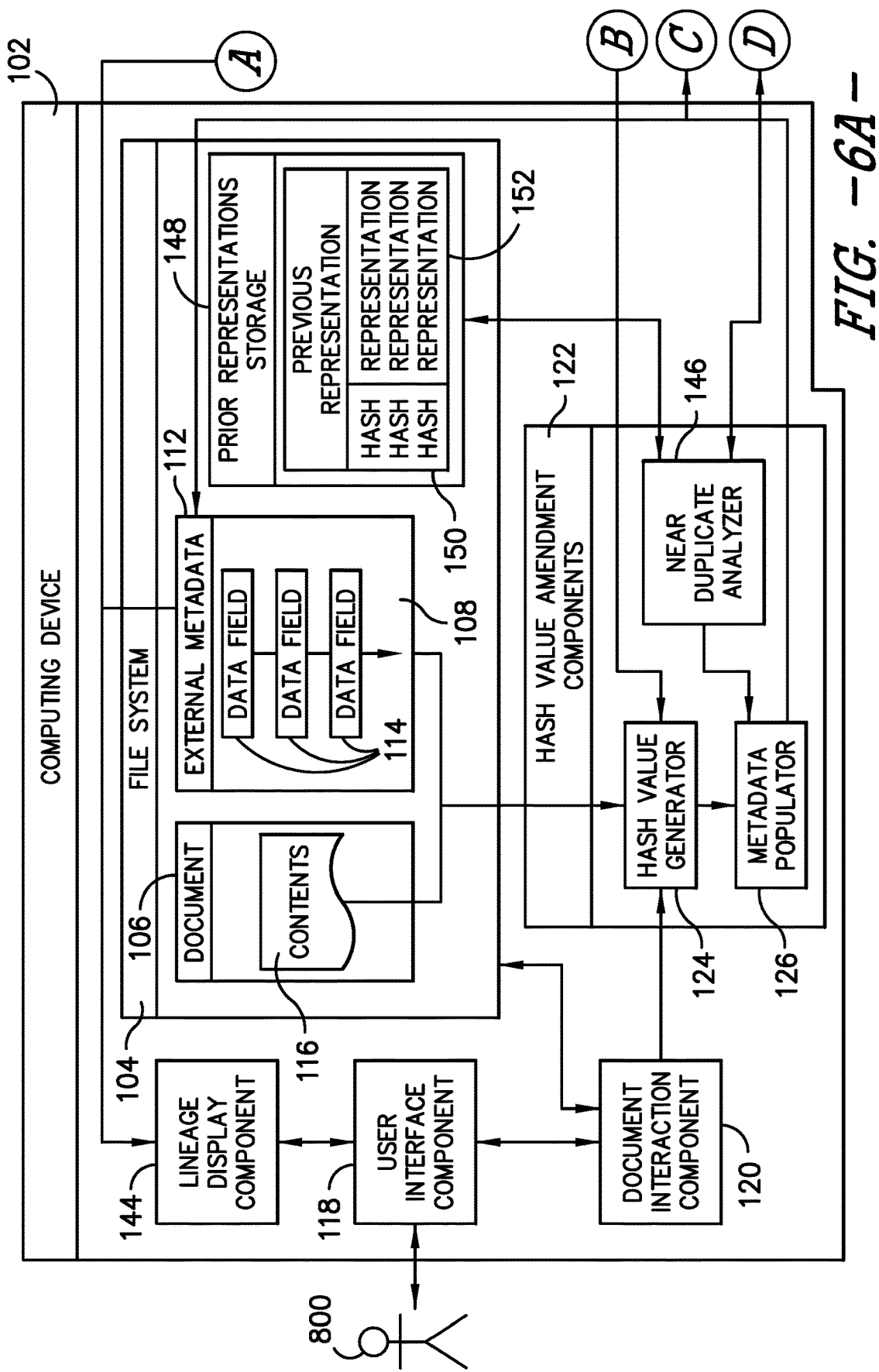
FIG. -6A-

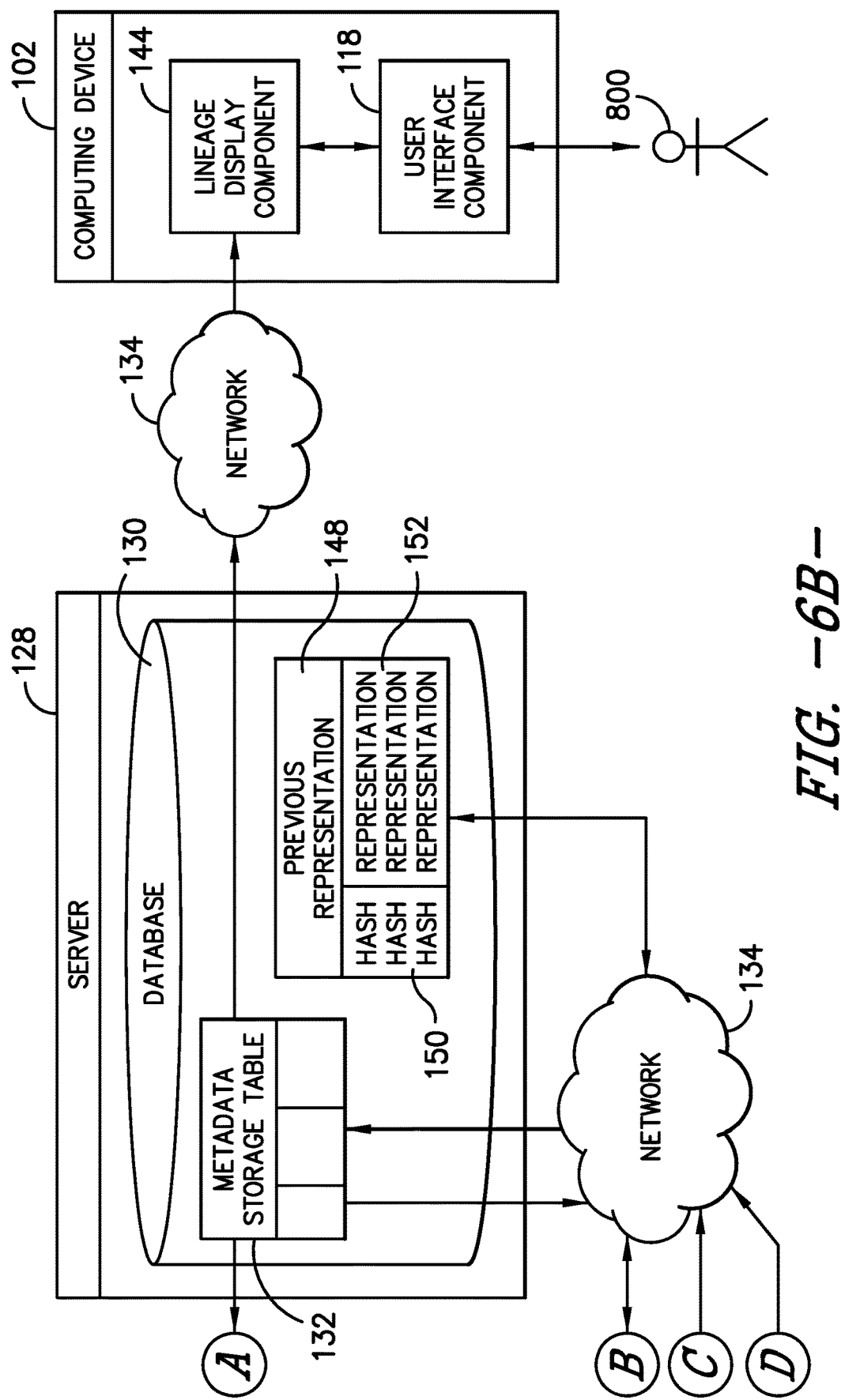
FIG. -6B-

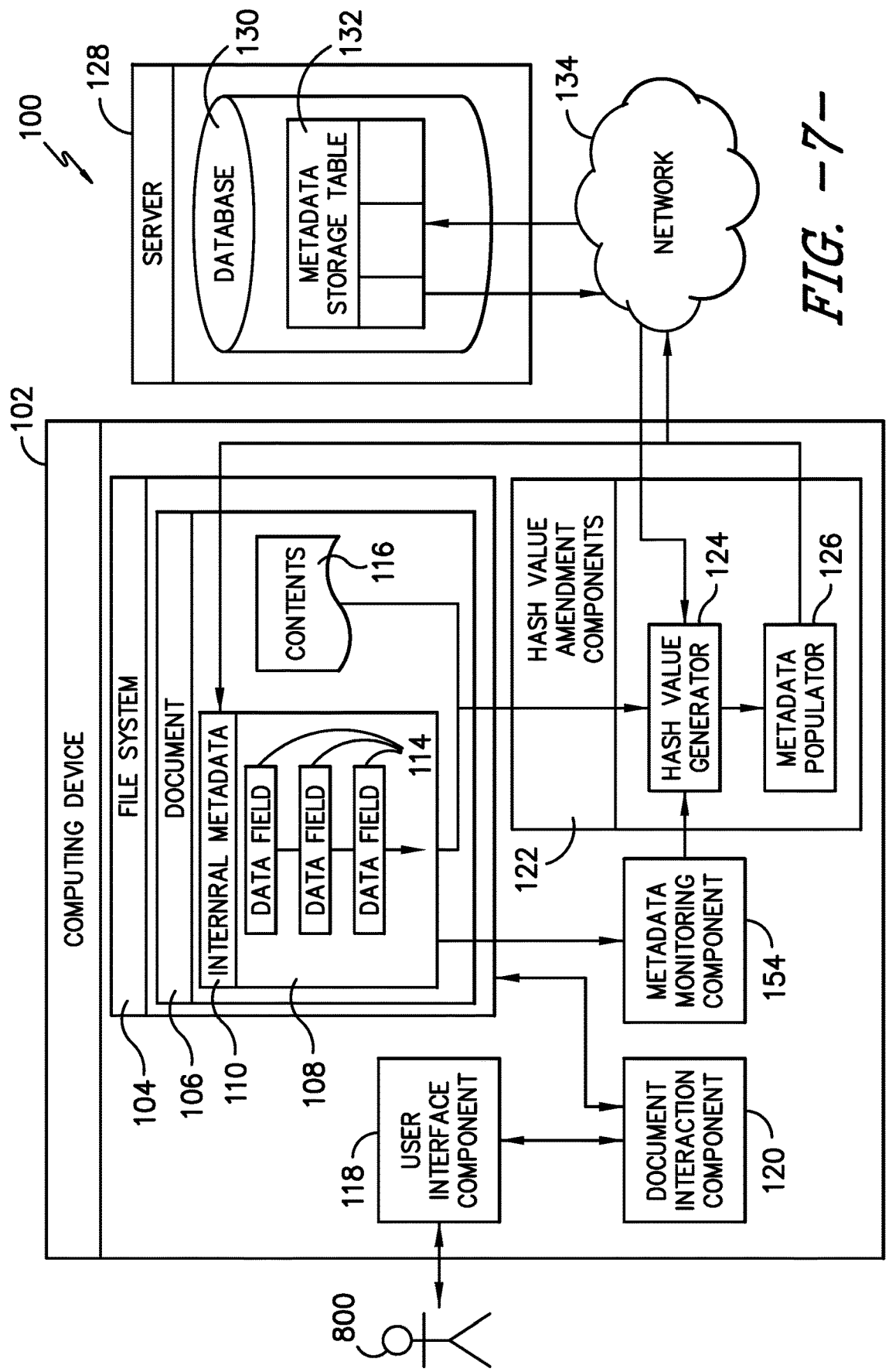
FIG. -7-

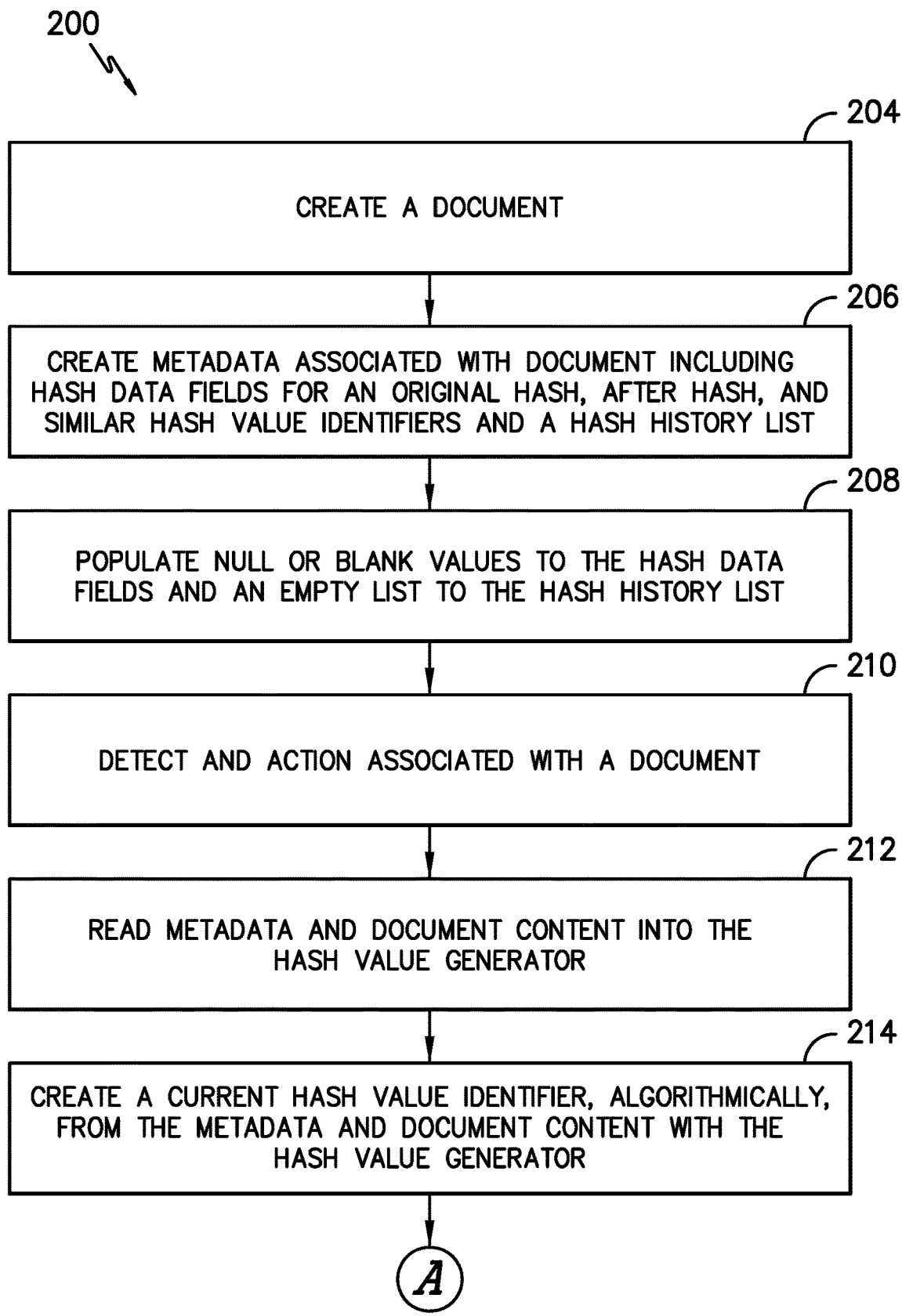
FIG. -8A-

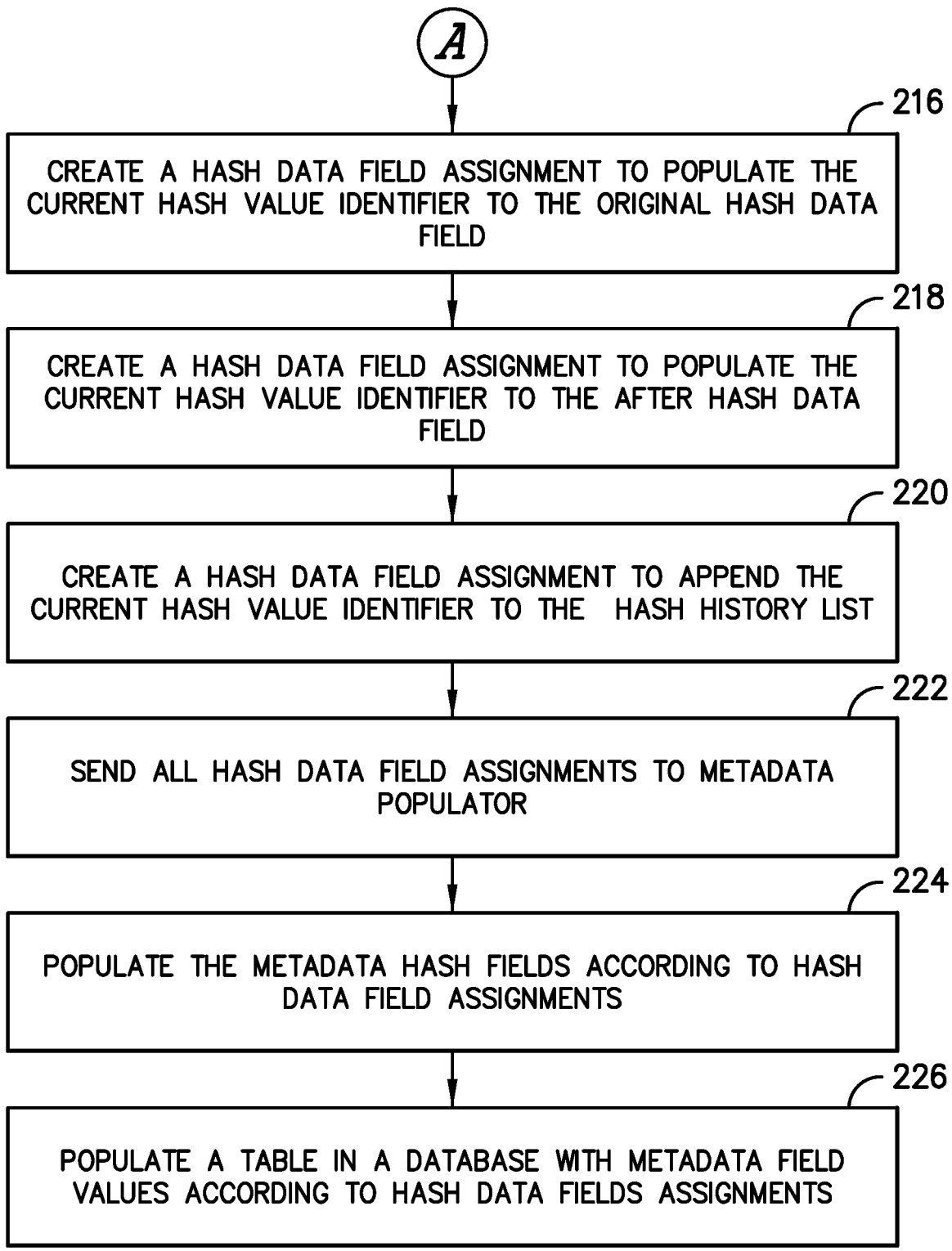
FIG. -8B-

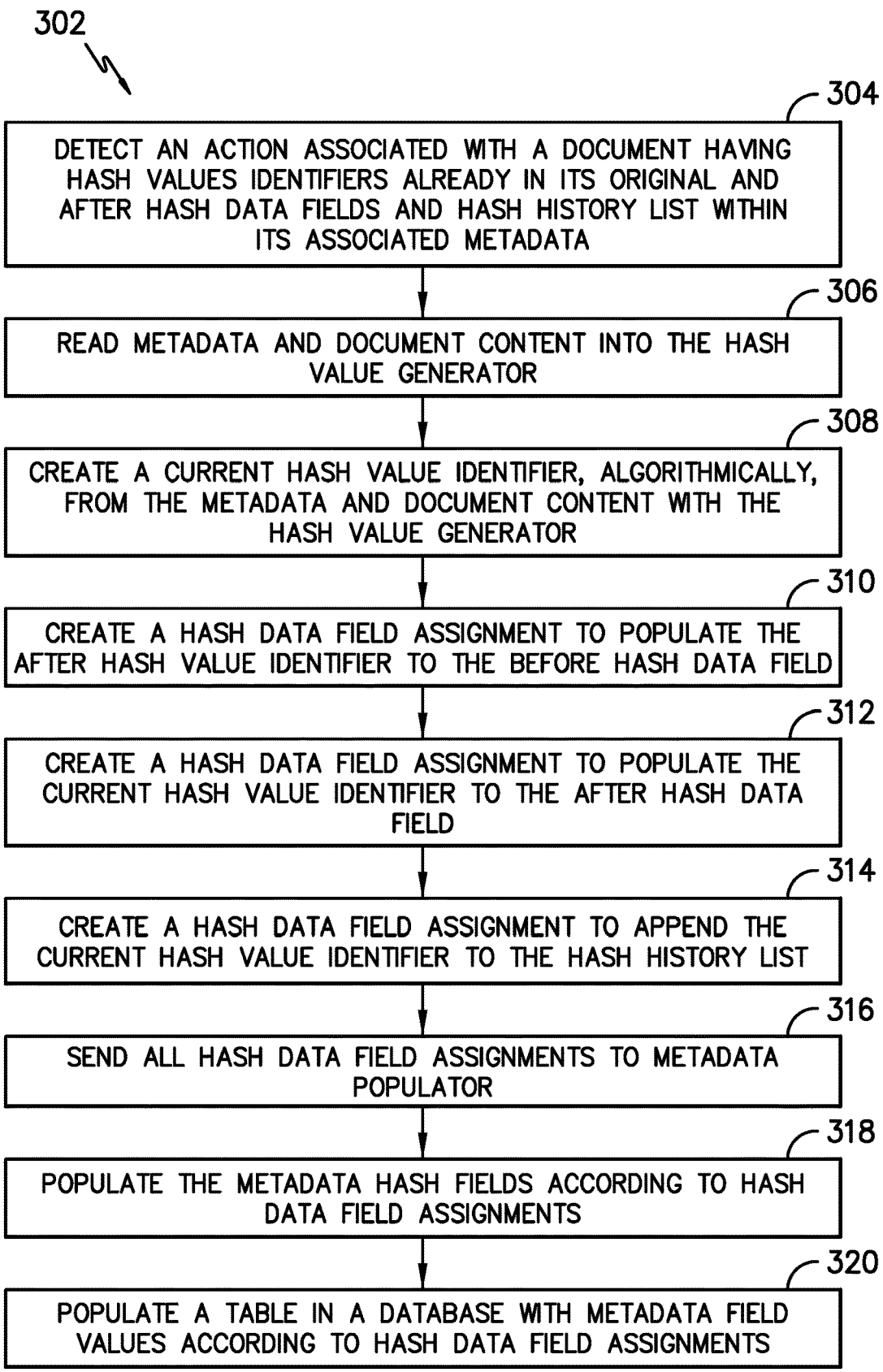
FIG. -9-

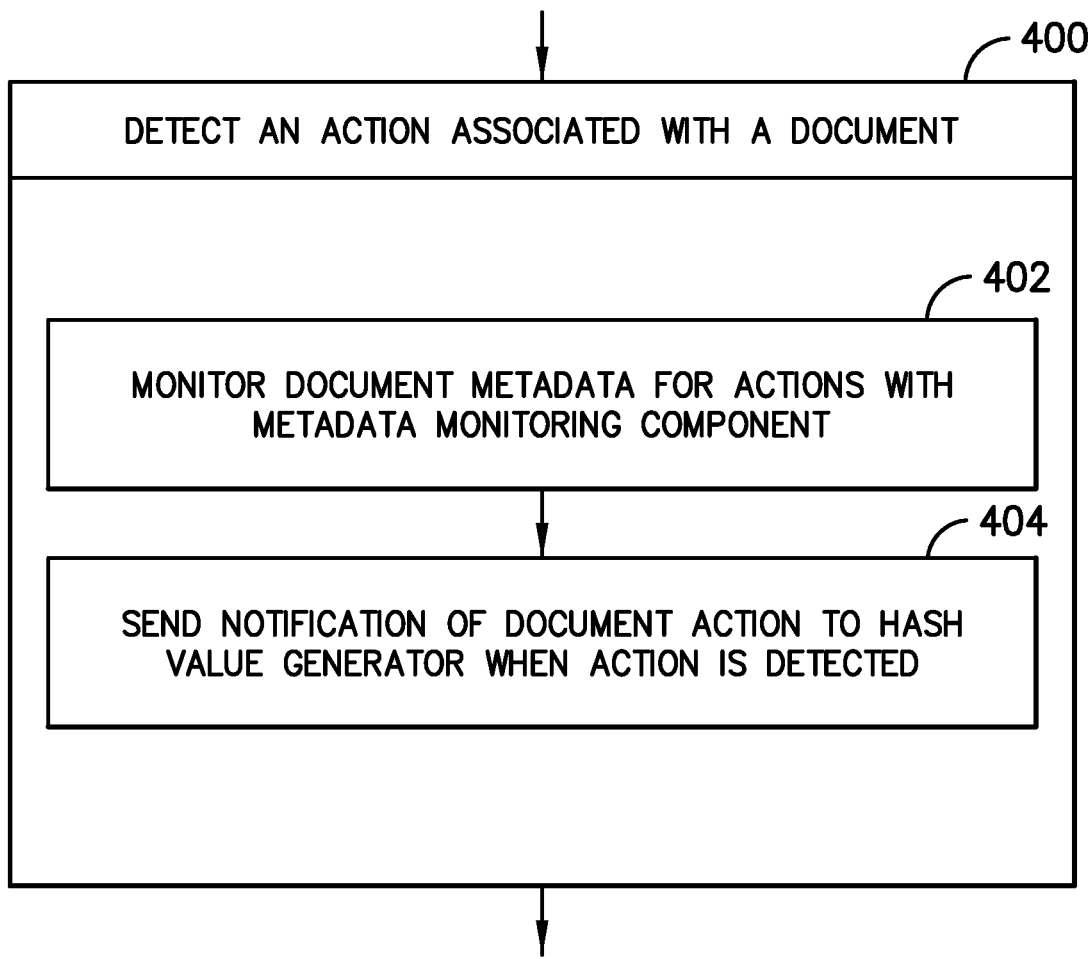
FIG. -10-

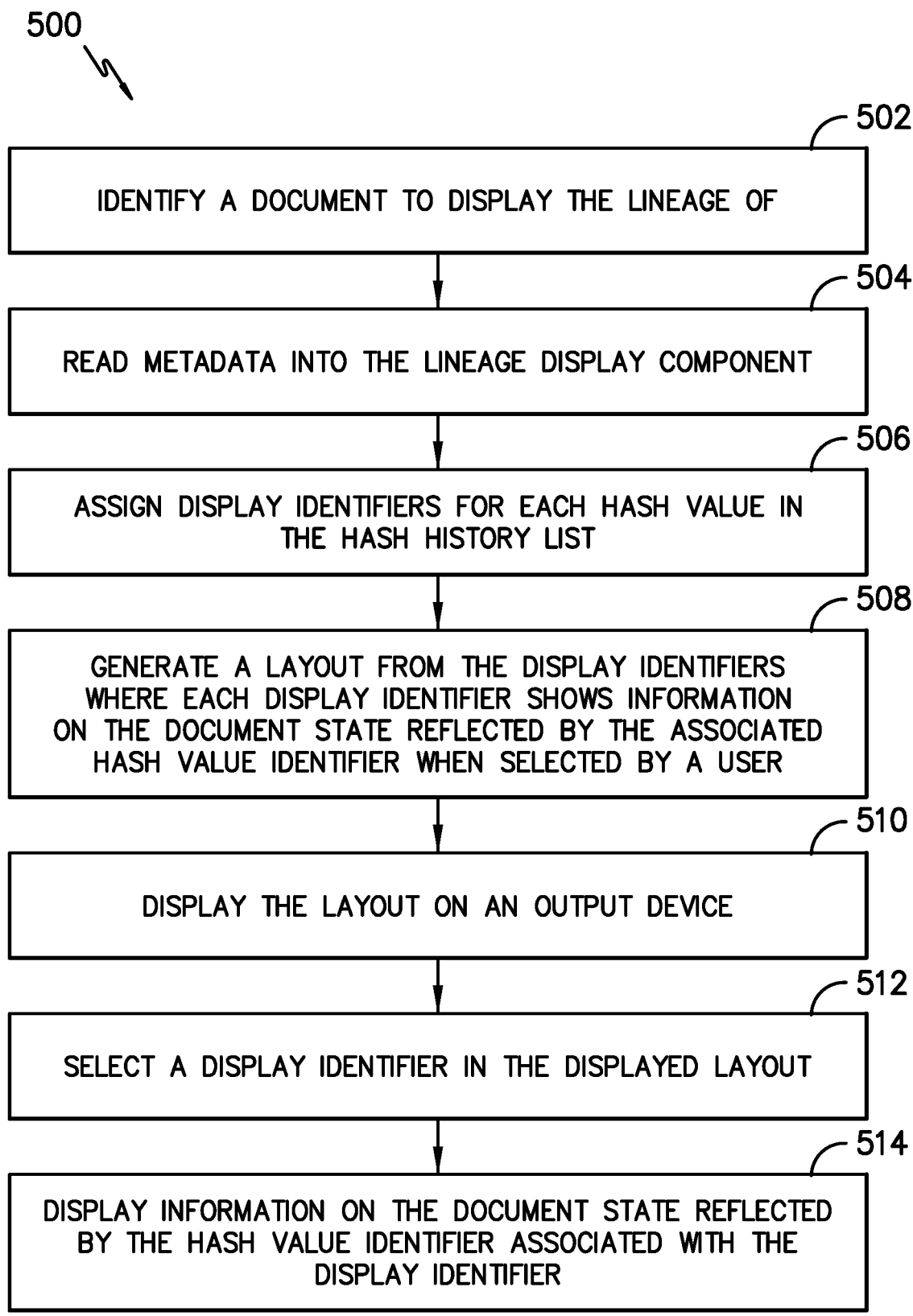
FIG. -11-

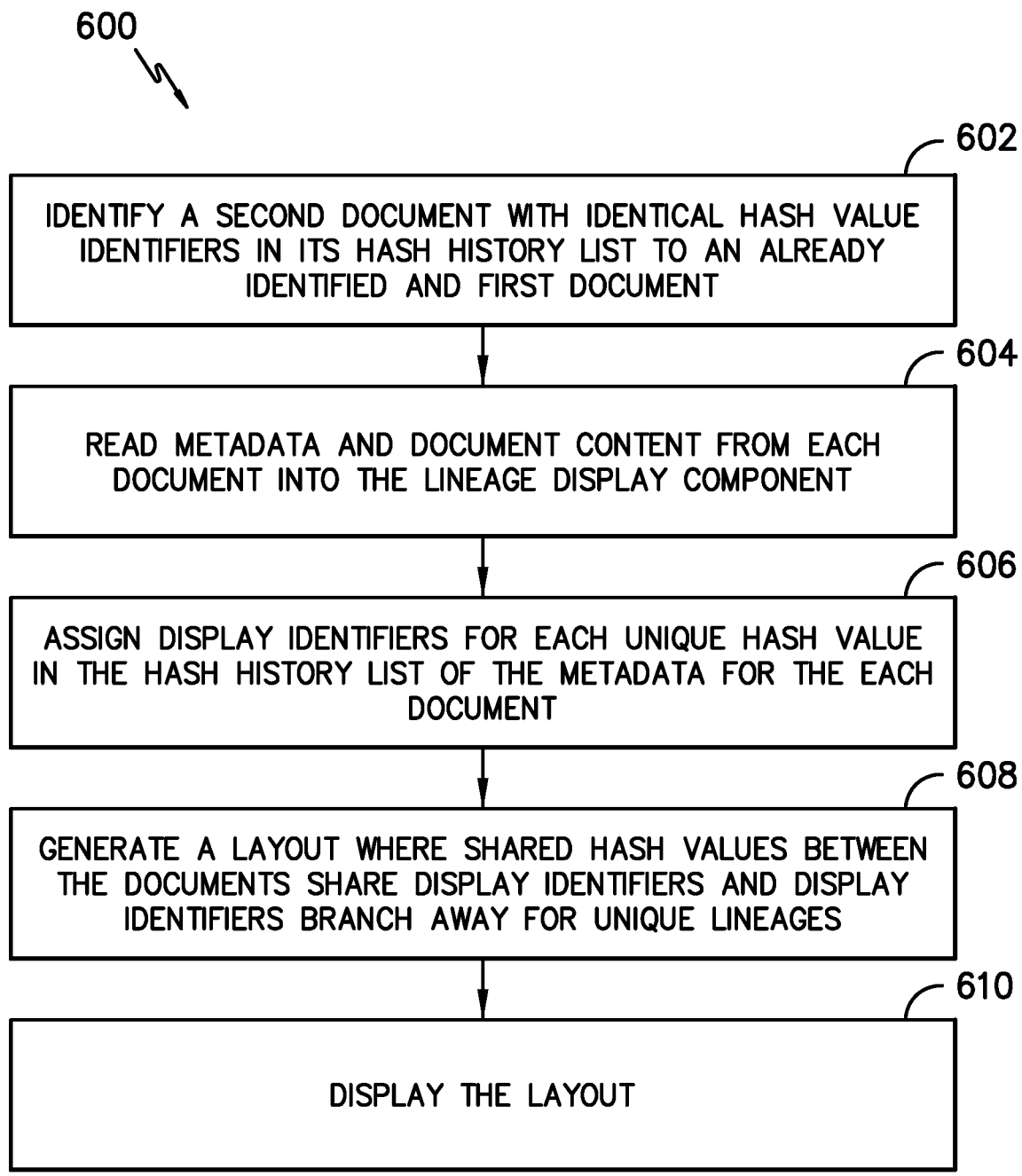
FIG. -12-

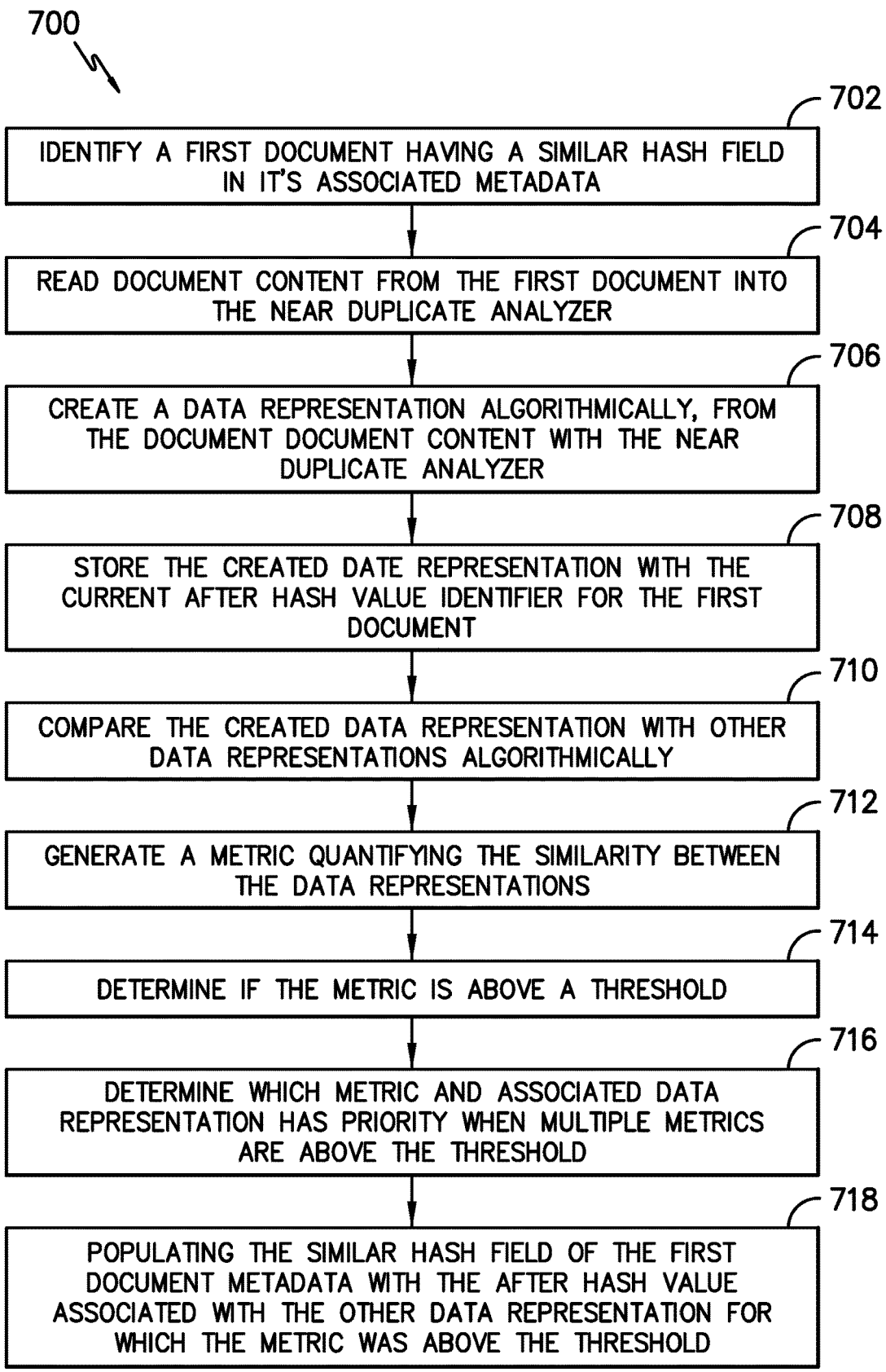
FIG. -13-

METHOD AND SYSTEM FOR DOCUMENT LINEAGE TRACKING

CROSS-REFERENCE TO RELATED APPLICATION

This application claims the benefit of U.S. Provisional Application No. 62/838,503, entitled METHOD AND SYSTEM FOR DOCUMENT LINEAGE TRACKING, filed on Apr. 25, 2019, which is hereby incorporated by reference in its entirety.

BACKGROUND OF THE INVENTION

The ability to track the lineage of electronic documents, also known as unstructured data, is quickly becoming a necessity in our technologically based society. When a user or organization is unable to see where a document comes from, or the changes associated with such documents during their existence, numerous problems can arise. For example, individuals and organizations are at risk of being misled if they place their faith in unverified official and/or current documents which may lead to a variety of negative outcomes. Also, due to a growing framework of regulatory and legal obligations, individuals and organizations need to be aware of the movement of documents to identify possible inadvertent disclosures of information and documents, to improve their efforts to secure their data, and to comply with privacy regulations that grant individuals access to certain information regarding the use and/or access of their personal data by others. Indeed, many regulations and legal obligations may require good faith efforts by individuals and organizations to secure documents and information in their custody and/or control in order to reduce their legal risk. For these reasons, and many others, the ability to track a document's lineage would assist organizations and individuals to meet their obligations and/or responsibilities and to reduce their risks.

However, it is currently difficult to provide thorough tracking of the lineage of an electronic document, and the difficulty is only increasing as the amount of electronic content grows. Indeed, one of the most basic methods of identifying information regarding a document involves review of the metadata associated with a document. Metadata is data that provides information about other data, such as a document, which may include fields for various document related information, such as a creation date, an author, and a last saved date. However, the accuracy of these values is often questionable and may be destroyed or altered during the life of the document. Indeed, tools and guides to circumvent the metadata for certain types of documents are readily available.

Other methods for identifying, controlling, and securing data exist. These methods generally fall into one of three classes. One class of these methods generally requires that data remain within a particular system, such as a data room or collaboration platform. Consequently, methods in this class do not track or provide information regarding a document's origination or changes outside of the system, as such information is not supposed to be removed from the system. Another class includes methods that control the perimeter of an organization to secure data within an organization. However, the methods which control a perimeter do not track documents' movements or changes within that organization. A last class includes methods that scan file systems and workstations to catalog documents. Methods in this class, however, do not track documents or provide information regarding a document's origination or changes made to the document.

In addition to tracking a document through its life, the ability to identify similar documents is also considered very useful today. One of the most well-known uses for identification of similar documents lies in plagiarism detection. However, the identification of similar documents also provides many additional benefits. For example, finding documents with similar language may enhance knowledge of topics of interest or identify families of documents within a large quantity of documents to assist with organizing the documents or to eliminate duplication of documents. No methods for tracking the lineage of documents provide information on likely similar documents and their relationships, nor do any methods or systems for finding similar information provide thorough identification and tracking of documents.

Consequently, it would be advantageous to provide a system or method which, in one or more aspects, provides the ability to track a document's lineage, including identifying its origination and information related to the history of changes associated with the document, provides the ability to identify documents with similar content, and allows a user to visualize the lineage of one or more documents, including those sharing a common origination.

BRIEF SUMMARY OF THE INVENTION

The present invention is directed to a document lineage tracking method and system that, in one or more aspects, provides the ability to track a document's lineage, including identifying its origination and information related to the history of changes associated with the document, provides the ability to identify documents with similar content, and allows a user to visualize the lineage of one or more documents, including those sharing a common origination.

In accordance with one embodiment of the invention, the present document lineage method and system includes having a document and its associated metadata within a file system on a computing device, such as a laptop or server. That document may be created initially or may be received from another computing device. When an action is taken with respect to the document, such as opening, reading, scanning, analyzing, saving, editing, moving, changing, modifying, printing, expanding, sending, receiving, copying, cutting, pasting, embedding, compressing, encrypting, formatting, translating, scanning, publishing, printing, tokenizing, changing extension, changing file name, changing/adding/modifying metadata or any other action on the document, a hash value identifier is generated. The hash value is generated algorithmically by a hash value generator based on information about that document, such as its metadata and content at the time of the action. The generation of the hash may also include using a "salt" value, or any other public or private cryptographic value, as an input to the hash function. This hash value serves as an electronic fingerprint identifying a document's state and is generally unique, particularly with respect to other hash values generated for the same document. The hash may also include the other hash values as inputs, providing the ability to detect changes to the other hashes by users, other programs, third parties, or any other system.

This hash value is updated to various fields tracked by the metadata, including being appended to a history list which tracks all previously associated hash values. Other fields tracked by the metadata are updated with previous hash values. Thereby, the metadata—through these tracked fields—allows for identification of hash values associated with the origination of a document, its state prior to the last action taken, its current state after the most recent action, and each previous state of the document during its lifecycle—generating a lineage of fingerprints for the document.

This metadata associated with the document may be stored in one or more of a variety of locations. For example, the metadata associated with the document may be internal, stored within the document's electronic content, and/or external, stored within the same file system or in an external database. Using the metadata, and accompanying hash values stored therein, an individual or organization can produce a lineage for the document through various states. This lineage may be used to check the veracity of a document and track its changes and movements. The lineage may also be used to compare the document to other documents with similar ancestry, identifying where they diverge, or branch, and changes associated with each. The lineage may also be used to identify when different lineages merge, such as in the case of attaching a document to an email or embedding one document (from one lineage) inside a different document (from either the same or different lineage).

In addition, the system and method may include utilization of lineage display components to depict the lineage of one or more documents, including branching documents. In such a way, the system and method provide a timeline, with points along the way, identifying the various states of a document during its lifetime, as obtained by the hash values. Likewise, the system and method may include utilization of a near duplicate analyzer or clustering algorithm to generate a representation of a document to be compared with other representations, identifying documents that are substantially similar, including documents without a common ancestry in their lineage. If a document is sufficiently close in comparison of representations to another document, the hash value identifying that other document may be stored in the metadata for the first document and vice versa. In this way, not only is the lineage of a document known—and possibly visualized—similar documents may be identified for review and comparison.

The ability to track a document's lineage and identify similar documents with different origins is fundamental to the control of information. Knowing where a document has been and what changes or actions have been made with respect to it allows users to identify channels of inadvertent releases of information. Also, while a user may be able to alter metadata for a document at a given time, it is unlikely a user would be able to produce or alter an entire history of a document, including associated hash values. Hashes include the current and previous hashes as inputs, and therefore can be used to detect tampering with one or more hash(es) associated with the document. Consequently, a user may be able to identify forgeries, user manipulation of hash data, and unofficial documents with greater ease and accuracy through the lineages thereof and trust in documents with full and correct lineages. Moreover, in instances where the metadata is stored externally, particularly within a database, a record exists to verify a document through comparison and which an individual or organization can use to track a document without possession of the document itself.

BRIEF DESCRIPTION OF THE DRAWINGS

These and other features, aspects, and advantages of the present invention will become better understood with regard to the following description, appended claims, and accompanying drawings where:

FIG. 1 is a system diagram of one embodiment of the system used to perform an embodiment of the document lineage method;

FIG. 2 is an exemplary block diagram for a system used to perform an embodiment of the document lineage method;

FIG. 3A is a system diagram of the computing device portion of one embodiment of the system, having multiple databases, used to perform an embodiment of the document lineage method;

FIG. 3B is a system diagram of the network and external service portion of one embodiment of the system, having multiple databases, used to perform an embodiment of the document lineage method;

FIG. 4A is an exemplary block diagram for part of a system, having multiple databases, used to perform an embodiment of the document lineage method;

FIG. 4B is an exemplary block diagram for part of a system, having multiple databases, used to perform an embodiment of the document lineage method;

FIG. 5 is a system diagram of one embodiment of the system, having a file system which tracks metadata, used to perform an embodiment of the document lineage method;

FIG. 6A is a system diagram of a computing device portion of one embodiment of the system, having a subject document, and having lineage display components to produce a representative lineage and a near duplicate analysis component, used to perform an embodiment of the document lineage method;

FIG. 6B is a system diagram of a server and external computing device portion of one embodiment of the system, having lineage display components to produce a representative lineage, used to perform an embodiment of the document lineage method;

FIG. 7 is a system diagram of one embodiment of the system, having a document action monitoring component, used to perform an embodiment of the document lineage method;

FIG. 8A is a first portion of a flow chart of one embodiment of the document lineage method associated with creation of and action related to a new document having metadata fields in accordance with an embodiment of this disclosure;

FIG. 8B is a second portion of the flow chart of the embodiment of the document lineage method of FIG. 8A associated with creation of and action related to a new document having metadata fields in accordance with an embodiment of this disclosure;

FIG. 9 is a flow chart of one embodiment of the document lineage method associated with action relating to an existing document having metadata fields in accordance with an embodiment of this disclosure;

FIG. 10 is a flow chart of one embodiment of the document lineage method associated with a document action monitoring component process in accordance with an embodiment of this disclosure;

FIG. 11 is a flow chart of one embodiment of the document lineage method associated with a lineage display component process to produce a lineage in accordance with an embodiment of this disclosure;

FIG. 12 is a flow chart of one embodiment of the document lineage method associated with a lineage display component process to produce the lineage of two documents with a partial common ancestry in accordance with an embodiment of this disclosure; and FIG. 13 is a flow chart of one embodiment of the document lineage method associated with a near duplicate component process to produce a lineage in accordance with an embodiment of this disclosure.

With reference to the above provided Figures, it is noted that data flows designated by a letter enclosed within a circle in a Figure designated by a number followed by a letter correspond to the same letter designated data flows in Figures designated by the same number but different letter. For example, data flow A and B in FIG. 3A correspond to data flow A and B in FIG. 3B. Thus, Figures designated by the same number and different letters form a single system when considered together.

DETAILED DESCRIPTION OF THE INVENTION

Definitions

To better understand the following invention, please note the following definitions used through this description:

The term "Computing Device" herein is used to identify a class of devices having accessible memory for electronic storage, and input, processing, and output means. Computing devices herein may be multi-user or dedicated. Examples of computing devices include desktop computers, laptop computers, tablet computers, smartphones, portable media players, and the like.

The term "File System" herein is used broadly to identify physical and virtual systems that can store electronic data. Examples of file systems include storage arrays, memory systems, hard drives, flash drives, optical discs, electronic collaboration systems, cloud data storage systems, data rooms, communication clients and systems, and other memory units capable of electronic data storage and retrieval.

The term "Document" herein is used as a broad and generic representation of electronic content, including any user or system created unstructured data. Examples of such include data files from word processors, text editors, multimedia editors, slide-show presentation software, email clients, text message, SMS, and chat clients, web-hosted communication tools, data rooms, collaboration tools, online content managers, and the like. The term file may also refer to a document, in some instances.

The term "Branching Documents" herein is used to refer to multiple electronic documents which originate from the same creation action, but which ultimately become distinct, independent files. For example, document A and document B are branching when document A was created on a computer and copied to form document B, distinct from document A and identified by a different storage location in electronic memory, so that a change to either of document A or B would not alter the other at the same time.

The term "Metadata" herein is used to refer to data which stores information about other data. For example, document metadata may refer to information about or related to a document, including the author, created data, last-modified date, location, file type, size, or the like. Additionally, metadata stored within its subject document is known as internal metadata and metadata stored outside its subject document is known as external metadata, herein. For example, external metadata may be stored in a file system or database separate from the file itself.

The term "Document Action" herein is used to refer to any activity, from a user, file system, or electronic device, which either views a file or changes the nature of a part or the whole of a document. Examples of document actions include, opening, reading, scanning, analyzing, saving, editing, moving, changing, modifying, expanding, sending, receiving, copying, cutting, pasting, embedding, compressing, encrypting, deleting, formatting, translating, scanning, publishing, printing, tokenizing, changing extension, changing file name, changing/adding/modifying metadata or the like.

The term "Hash Value" (also called "hash") herein is used to refer to values returned by a hash function, i.e., a function used to map data of arbitrary size to fixed-size values. The hash function utilizes a hash or fingerprinting algorithm which, herein, may be any one of the standard algorithms currently known and used in the field or a custom or later-developed algorithm for such purposes. This may also include using a "salt" value, or any other public or private cryptographic value, as an input to the hash function.

The term "comprises," and grammatical equivalents thereof, are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Invention Generally

With reference now to the drawings, a system 100 and method 200, 302 for tracking the lineage of an electronic document 106, including the history of possession, activity on, and changes related to the document 106, is included herein. Generally, the invention, in one or more embodiments, allows for the tracking of one or more documents 106, including branching documents, with the tracked ancestry being stored through hash values in metadata 108 located in one or more of: 1) within the document 106 itself, 2) within a file system 104 storing the document 106, 3) or within an external file system—like a database 130 on a server 128. The invention further allows for the display of information about the lineage 500, 600, including a history of a document's evolution, and identification and tracking of near duplicate, i.e. similar, documents 700.

First Representative Embodiment of the System

As shown in FIGS. 1 and 2, a first embodiment of the system 100 includes an electronic computing device 102. As in FIG. 2, the computing device 102 comprises memory, such as the hard drive 136, RAM 138, and cache 140, and a central processing unit (CPU) 142 to carry out stored instructions. The computing device 102 also has a file system 104 within its memory, as in FIG. 1. The file system 104 hosts, or will host, a document 106 having internal metadata 110 with data fields 114, for storage of information about the document 106, and content 116. The computing device 102 also has a user interface component 118, though which a user 800 may interact with and control the computing device 102 as in FIG. 1. The user interface component 118 may comprise one or more input and output devices, including a keyboard, mouse, controller, touch screen, monitor, projector, display, or the like, and drivers therefor.

Further, the computing device 102 also includes a document interaction component 120 as shown in FIG. 1. Examples of document interaction components 120 include word processors, slideshow editors, multimedia editors, text editors, spreadsheet editors, email clients, custom programs, operating system functions, and the like. In some embodiments, the document interaction component 120 may be associated with the file type of the document 106. However, it is foreseen that the document interaction component may also be a file system manager, i.e. a tool that allows a user 800 to see a file system 104 as a whole and interact with files therein.

Additionally, the computing device 102 also has hash value amendment components 122 including a hash value generator 124 and metadata populator 126. The hash value generator 124 receives information from a document 106, including content 116 and metadata 108, and utilizes an algorithm to produce a Hash Value Identifier representing the input data. Content, herein, may include more than just the text of a particular document. Indeed, it may include previous hashes, current hashes, user name, email recipients, communication participants, a file name, a file path, the time of day, the organization, or any other applicable information. The input to the hash value generator 124 may also include the other hash fields, a "salt" value, or any other public or private cryptographic value. The hash value generator also produces assignments of hash values to populate particular data fields 114 of the metadata 108. These assignments are then provided to the metadata populator 126, which carries out writing and editing the metadata 108 accordingly. In the embodiment of FIG. 1, the metadata 108 is stored within the document 106, i.e., its internal metadata 110, and is also stored on an external server 128 in a metadata storage table 132 within a database 130. The metadata 108 may also be stored in the file system 104. Though the Figures of the present invention show the database 130 as based on a single server 128, it is also foreseen that the server 128 may be single-instance, distributed, or cloud-based. Also, though the database 130 is described herein as a table, specifically a metadata storage table 132, it is foreseen that the metadata 108 may be stored in any database object, i.e., a data structure used to either store or reference data.

The embodiment of FIG. 1 shows the server 128 separated from the computing device 102 by a network 134. It is foreseen that this network may be the internet, as in FIG. 2, or a local area network. Though not shown, it is also foreseen that the server 128 may be connected with the computing device 102 directly and not be separated by a network 134. The storage of metadata 108 in a database 130, provides the benefit of reducing the memory storage requirements on the computing device 120, redundancy when utilized with another metadata 108 storage location, and accessibility—allowing access to lineage information to others beyond the user 800 of the computing device 102 with the document 106. The accessibility provided by storage of the lineage information in an external database 130 would be beneficial to organizations who have an interest in tracking data, particularly their own.

First Representative Embodiment of a Method of Use

In a first embodiment, a method 200 for using the document lineage tracking system 100 may be one or a combination of two methods, a method for tracking involving initial document creation 202 and involving already existing documents 302.

Method Involving Initial Document Creation

As shown in FIGS. 8A and 8B, this method 202 starts with creation of the document 204 and creation of its associated metadata 206. The metadata 108 created has data fields 114 for original, before, and after hash value identifiers and a hash history list. The data fields 114 and identifiers are created in memory, stored in the document 204, or stored in the file system 104 and then sent to a database 130. These data fields 114 are then populated with blank or null values and an empty list for the history list 208. After creation, the method involves detecting and action 210 regarding the document 106 created. Upon detection, the metadata 108 and content 116 of the document 106 are read 212 by the hash value generator 124. The hash value generator 124 then creates a hash value, called a current hash value, based on the information read 214. The hash value generator then creates several assignments, or instructions, to 1) populate the original hash data field with the current hash value 216, 2) populate the after hash field with the current hash value 218, and 3) append the current hash value to the history list 220. These assignments are sent to the metadata populator 222 and the populator amends the metadata 108 for the document based on the assignments 224. The metadata populator also populates a metadata storage table 132 in a database 130 based on those assignments 226. Thereby, a document 106 is created and the first document action in its lineage is recorded in metadata 108 for tracking purposes.

Method Involving an Existing Document

As shown in FIG. 9, after creation or receipt of a document 106 having appropriate metadata 108, the document lineage tracking method 302 starts with detecting a document action 304. Upon detection, document metadata 108 and content 116 for the document 106 are read 306 by the hash value generator 124. This information is used to create a current hash value identifier 308. The hash value generator also creates assignments, or instructions, to 1) populate the before hash value data field with the value that is in the after hash value identifier of the document 310, 2) populate the after hash value data field with the current hash value 312, and 3) append the current hash value to the hash history list 314. Then, as with the initial document creation method 202, the assignments are sent to the populator 316 and metadata is populated to the internal metadata 318 and database table 320. Thereby, the metadata 108 for a document 106 is amended to reflect different states of the document 106 with each state representing a change due to a document action. This amendment, particularly to the hash history list, provides the ability to track the lineage of a document 106 through its lifecycle.

Alternative Representative Embodiments

Multiple Databases

In an additional embodiment of the system 100, it is foreseen that the metadata 108 for a document 106 may be populated and stored in multiple databases 130 as shown in FIGS. 3A, 3B, 4A, and 4B. As in FIGS. 3A and 3B, these databases 130 may be located on different servers 128 in communication with the electronic device 102 so that the they receive metadata information from the metadata populator 128 directly or through an intermediary server 128. Moreover, while the databases 130 in FIGS. 3A, 3B, 4A, and 4B are shown on separate servers, it is foreseen that the metadata populator 128 may amend metadata storage tables 132 on the same server. Also, while storage of the metadata 108 is only shown accompanying storage in either the document 106 or file system 104 in the Figures, it is foreseen that the only storage of metadata information in accordance with this may be a database 130. In the methods of use for such embodiments for the system 100, the metadata for the document 106 after a document action would be populated to all applicable databases 130.

External Metadata

In a further embodiment of the system 100, the metadata 108 for a document 106 may be external 112 and stored within the file system 104 separate from the document 106 itself as shown in FIG. 5. Though metadata 108 is shown as only being populated within the file system 104 and the database 130 it is foreseen that the system 100 may have both external metadata 112 and internal metadata 110, that is metadata within the document 106 and within the file system 104 separately—with or without the backing up the metadata 108 in a database 130. In the method of use for such embodiments of the system 100, the metadata 108 would be populated to all the applicable metadata storage locations, whether located internally, externally, or on a database 130. This metadata may be stored in a format applicable to the storage system itself, or it may be stored in a file on the file system.

Lineage Display Component

In another embodiment, the system 100 also includes one or more lineage display components 144, as shown in FIGS. 6A and 6B. Each lineage display component 144 reads metadata 108 information, from one or more metadata storage locations, such as internal metadata 110, external metadata 112, or a metadata storage table 132 in a database 130. After reading the information, the lineage display component 144 generates a representative layout representing the lineage of that particular document 106. Thereby, a user may be provided easy efficient access to document history information, helping that user verify documents are from expected sources and haven't been tampered with. As shown in FIGS. 6A and 6B, the lineage display component 144 may be part of the computing device 102 on which the document 106 is stored or may be part of another computing device 102 reading metadata 108 information stored externally, such as in a database 130 on an external server 128. Accordingly, the lineage display component 144 can allow users 800, such as organizations, to track certain documents 106, no matter who possesses the document 106.

Near Duplicate Analyzer

Moreover, it is foreseen that an embodiment of the system 100 may also include a near duplicate analyzer 146, as in FIGS. 6A and 6B. Generally, the near duplicate analyzer 146 operates by creating a document representation 152 of a document 106 and comparing that representation 152 with prior created representations of documents either within the same lineage or other documents outside the lineage. Similarity between the representations 152 may be reflected in a generated metric. If that metric is above a certain threshold, the documents 106 would be considered similar. If there are multiple similar documents 106, a single document 106 could be determined to have priority based on predetermined specifications. If a document 106 is considered similar and has priority, if necessary, the after hash value identifier of that document may be assigned to a similar hash data field 114 in the metadata 108 for the first document 106. It is foreseen that the system 100 may include one or more prior representations storage 148 locations for prior created document representations 152 and their associated after hash values 150 to provide a bank for comparison. It is also foreseen that the prior representations storage 148 may be located on one or both of an electronic device 102 or external server 128. Storage on a server 128 would allow for the comparison of a document 106 with a larger bank of prior document representations 152, providing an enhanced search benefit.

Metadata Monitoring Component

In a further embodiment shown in FIG. 7, it is foreseen that the system 100 may include a separate metadata monitoring component 154 to detect a document action. This component 154 would monitor both the internal metadata and external metadata 108 for a document 106 and notify the hash value generator 124 when a document action is detected. In lieu of the metadata monitoring component 154, the hash value generator 124 may also be notified of a document action by document interaction component 120. Though not reflected in the Figures, it is also foreseen that the metadata monitoring component 154 may a part of one or both of the hash value amendment components 122 and the hash value generator 124 itself.

Alternative Representative Methods of Use

Metadata Monitoring Component Process

In one embodiment, the method may include a process of detecting of a document action utilizing a metadata monitoring component 400, as shown in FIG. 10. In such an embodiment, the step in the various methods for detecting a document action may be segmented into two parts. The first part being to monitor the document metadata for document actions with the metadata monitoring component 402. The second part being to send a notification that a document action has occurred to the hash value generator 404. Thereby, the hash value generator 124 only reads the metadata 108 associated with a document 106 when notified that a document action has occurred by the metadata monitoring component 154 conserving computing resources. As a document action is generally the impetus for generating a current hash value and for amending the metadata 108 for a document 106, utilizing a separate dedicated component, such as a daemon, agent, scanner, or other dedicated monitoring system to monitor the metadata 108 can provide a benefit and robustness to the system and method.

Display of Document Lineage

In one embodiment, the system 100 may include a lineage display component 144. In use, there may be two methods for the process of displaying the lineage of a document according to such a system, as shown in FIGS. 11 and 12.

Display of a Single Document Lineage

In one method 500, the system generates a display representing a single document's lineage. In the embodiment shown in FIG. 12, this method begins by the identification of a subject document 502. Upon selection and identification of that document, the Lineage Display Component reads the metadata associated with the document 504. As shown in FIGS. 6A and 6B, and described previously, this metadata 108 may be on the same electronic device 102 as the subject document 106 or in an external database 130. Once read, the lineage display component assigns display identifiers for each hash value in the hash history list 506. These display identifiers may be words, images, icons, graphics, or the like. For example, a document icon may represent each hash value. The lineage display component then generates a layout involving the display identifiers 508. In the embodiment of FIG. 11, the display identifiers may be selected to display more information regarding the document state identified by the hash. It is also foreseen, that, in lieu of such, the display identifiers may already show that information or provide no interaction or information at all. Though not discussed in FIG. 11, it is also foreseen that the layout may arrange the display identifiers in a particular order, such as oldest to newest. After creation, the layout is displayed to the user 510, such as through the user interface component 118. The method according to FIG. 11 also includes steps for selection of a document identifier 512 and the display of information regarding the document state associated with the display identifier 514. These steps, however, are not necessary if the information is already displayed or no information or interaction is to be provided. The above methods of document lineage display allow a user 800 to ability to easily inspect a document's lineage to verify the document's origin and changes associated with it. It should be noted that information other than that relating to document lineage may also be shown in the display.

Display of Branching Document Lineages

In another method 600, the system 100 may generate a display for the lineages of branching documents. In the embodiment shown in FIG. 12, this method 600 begins with identifying a second document after identifying the first where the second has identical hash values to the first in its hash history list 602. Once identified and selected, the metadata from each document can be read by the lineage display component 604. Once read, the lineage display component can assign display identifiers for each unique hash value 606. Where the documents have identical hash values, they will share a display identifier. So, once assigned, the lineage display component will generate a layout so that shared hash values share display identifiers and display identifiers branch away for a unique lineage 608, particularly if the layout takes the form of a timeline. Thereafter, the layout is displayed 610. Though not provided in FIG. 12, it is foreseen that each document identifier may display information therewith or be selectable to display information about the document state represented by the hash value. The presented method allows for the easy visualization of branching lineage, providing a benefit when inspecting two documents which were the same at origination, but which ultimately were acted upon separately.

Similar Document Identification Process

In another method 700, a system including a near duplicate analyzer 146 may also provide the hash value for a particular similar document to the metadata populator 126 to be stored in similar hash value data field 114, as shown in FIG. 13. The method thereof begins with the identification of a first document 702. The content of this first document is then read into the near duplicate analyzer 704. Using an algorithm, the near duplicate analyzer creates a data representation of the document 706. Examples of data representations that could be created and utilized include shingles, n-grams, parts of speech, doc2vec, word2vec, image similarity, correlation, convolution, or the like. The created data representation is then stored along with the after hash value of the document. This storage forms the pool for future searches. Thereafter, the data representation is compared with prior generated data representations 710. For each comparison, a similarity metric is generated 712. For each similarity metric, it is determined whether that metric passes a defined threshold 714, indicating the document associated with the data representation is similar to the first document. If there are multiple similar documents, i.e. those for which the metrics exceeded the threshold, either a single document may be determined to have priority based on predetermined specifications 716, or all documents may be retained as similar to the first document. The after hash value for either one or multiple documents is then populated to the similar hash field of the first document 718.

Although the present invention has been described in considerable detail with possible reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features. Further, it is not necessary for all embodiments of the invention to have all the advantages of the invention or fulfill all the purposes of the invention.

In the present description, the claims below, and in the accompanying drawings, reference is made to particular features of the invention. It is to be understood that the disclosure of the invention in this specification includes all possible combinations of such particular features. For example, where a particular feature is disclosed in the context of a claim, that feature can also be employed, to the extent possible, in aspects and embodiments of the invention, and in the invention generally.

Also, although the description above contains many specificities, these should not be construed as limiting the scope of the embodiments but as merely providing illustrations of some of several embodiments. Thus, the scope of the embodiments should be determined by the appended claims and their legal equivalents, rather than by the examples given.

What is claimed is:

1. A system for document lineage tracking comprising:
an electronic computing device having memory for electronic data storage including a file system wherein at least one document having content is stored;
metadata related to said at least one document having one or more data fields for an assignment of data related to said at least one document;
hash value amendment components comprising: a hash value generator for transforming said metadata and document content into a current hash value, said hash value representing a state of a document at a specific time; and a metadata populator connected to both said hash value generator and metadata through data communication pathways so that said current hash value is written in one or more of said data fields of said metadata; and
a near duplicate analyzer connected to said content and said metadata populator through data communication pathways to transform said content into a data representation for comparison with other data representations to identify a similar document, where the similarity between said data representations is reflected in a generated similarity metric, and when said generated similarity metric exceeds a predetermined threshold quantifying the similarity between said data representations, a hash value associated with the at least one document from which said similar data representation was created is written in a data field in said metadata.

2. The system for document lineage tracking of claim 1, further including a lineage display component connected to said metadata through a data communication pathway to transform hash values in said metadata into lineage information related to said at least one document.

3. The system for document lineage tracking of claim 1, further including a data representation storage object connected to said near duplicate analyzer to store data representations.

4. The system for document lineage tracking of claim 1, further including a monitoring component operatively connected to said hash value generator controlling when said hash value generator produces said current hash values.

5. The system for document lineage tracking of claim 1, wherein said metadata is stored within said file system.

6. The system for document lineage tracking of claim 5, wherein said metadata is stored within said at least one document.

7. The system for document lineage tracking of claim 1, further including a database having a database object wherein said metadata is stored.

8. The system for document lineage tracking of claim 7, wherein said database object is a table.

9. The system for document lineage tracking of claim 7, wherein said database is server-based.

10. The system for document lineage tracking of claim 7, wherein said database is cloud-based.

11. The system for document lineage tracking of claim 7, wherein said database is a distributed database.

12. A method for document lineage tracking, comprising the steps of:
providing an electronic computing device having an electronic file system within a memory of the electronic computing device and a hash value generator to produce instructions for a processing unit;
identifying a document and associated metadata having data fields including a field for storage of a hash value representing a similar document;
detecting a document action regarding said document with said hash value generator; reading information from said data fields and content from said document with said hash value generator;
creating a current hash value from said document data fields and content, wherein said current hash value is associated with a state of said document at a specific time;
writing said current hash value to at least one of said data fields to memorialize said state of said document;
providing a near duplicate analyzer to produce instructions for said processing unit; reading content from said document with said near duplicate analyzer;
creating a data representation from said content;
comparing said data representation to previously stored data representations created from content of other documents;
generating a similarity metric quantifying the similarity between said created data representation and a second data representation; and
writing a hash value associated with said document from which said second data representation was created when said similarity metric exceeds a predetermined threshold.

13. The method for document lineage tracking of claim 12, wherein said metadata comprises a history list for hash values representing prior states of said document; and said method further comprises the step of:
appending said current hash value to said history list to track the lineage of previous document states.

14. The method for document lineage tracking of claim 13, wherein said data fields include fields for storage of the first generated hash value for said document, indicating said document's origin, a before hash value, indicating said document's adjacent previous state, and an after hash value, indicating said document's current state.

15. The method for document lineage tracking of claim 14, wherein said at least one data field written to includes that for the first generated hash value and the after hash value and said method further comprises the step of:
creating said document and associated metadata with blank data fields and an empty history list.

16. The method for document lineage tracking of claim 14, further comprising the step of copying a hash value from said data field for said after hash value and writing said copied value in said before hash value data field.

17. The method for document lineage tracking of claim 12, further comprising the step of storing said created data representation with previously stored data representations.

18. The method for document lineage tracking of claim 12, further comprising the steps of:
generating a second similarity metric;
prioritizing one similarity metric based on predetermined specifications; and
discarding the other similarity metric.

19. The method for document lineage tracking of claim 13, further comprising the steps of:
providing a lineage display component to produce output for said computing device;
reading said metadata with said lineage display component;
assigning a display identifying element to each hash value appended to said history list;
arranging said display identifying elements assigned in a layout; and
outputting said layout from said computing device to provide a representation of the lineage of said document to a user.

* * * * *